United States Patent
Krause et al.

(10) Patent No.: US 11,326,711 B2
(45) Date of Patent: May 10, 2022

(54) CONTROL VALVE FOR A PROCESS PLANT

(71) Applicant: SAMSON Aktiengesellschaft, Frankfurt am Main (DE)

(72) Inventors: Sebastian Krause, Bruchköbel (DE); Michael Merscher, Roedermark (DE); Janusz Koinke, Obertshausen (DE); Joerg Kuehnbaum, Nieder-Olm (DE)

(73) Assignee: SAMSON AG, Frankfurt am Main (DE)

( * ) Notice: Subject to any disclaimer, the term of this patent is extended or adjusted under 35 U.S.C. 154(b) by 0 days.

(21) Appl. No.: 17/000,359

(22) Filed: Aug. 23, 2020

(65) Prior Publication Data

US 2021/0062933 A1    Mar. 4, 2021

(30) Foreign Application Priority Data

Aug. 27, 2019   (DE) ..................... 20 2019 104 694.5

(51) Int. Cl.
*F16K 31/06*   (2006.01)
*F16K 27/08*   (2006.01)

(52) U.S. Cl.
CPC .......... *F16K 31/0686* (2013.01); *F16K 27/08* (2013.01)

(58) Field of Classification Search
CPC .......... F16K 27/08; F16K 27/02; F16K 37/005
See application file for complete search history.

(56) References Cited

U.S. PATENT DOCUMENTS

| | | | |
|---|---|---|---|
| 9,494,243 B2 * | 11/2016 | Loveless | ................. F16K 27/00 |
| 2002/0104568 A1 | 8/2002 | Cronimus | |
| 2005/0115619 A1 | 6/2005 | Kawulka et al. | |
| 2014/0306134 A1 | 10/2014 | Schubert et al. | |
| 2015/0059874 A1 | 3/2015 | Loveless et al. | |
| 2017/0016749 A1 | 1/2017 | Jelken et al. | |

FOREIGN PATENT DOCUMENTS

| | | |
|---|---|---|
| DE | 102013101302 A1 | 8/2014 |
| WO | 2012023125 A1 | 2/2012 |

OTHER PUBLICATIONS

European Patent Office, Translation of European Search Report, dated Dec. 23, 2020, pp. 1-8, Registration No. EP20193010.
German Patent and Trademark Office, Translation of Office Action, dated Aug. 21, 2020, pp. 1-3 Application No. 202019104694.5.

* cited by examiner

*Primary Examiner* — Umashankar Venkatesan
(74) *Attorney, Agent, or Firm* — Woodling, Krost and Rust

(57) ABSTRACT

The invention relates to a control valve (10) for a process plant, comprising an actuator (16) which is connected to, and spaced from, a valve body (12) of a valve unit (11) via a yoke (14), the valve body (12) having a housing flange (32) which is detachably connected to the yoke (14), with the valve body (12) having an inlet (20) and an outlet (22) adapted to allow the flow of a process fluid therethrough, which inlet (20) and outlet (22) are each arranged in a fluid connection region (18, 19), and with an actuating member adapted to be displaced by the actuator (16) for controlling the flow rate of the process fluid being arranged in the passage (24) from the inlet (20) to the outlet (22). The invention is characterized in that the housing flange (32) connected to the yoke (14) has at least one recess (44) as well as a yoke fastening region (33), with the yoke fastening region (33) being formed as a bolt hole circle (34) with radially arranged connecting holes (36).

9 Claims, 3 Drawing Sheets

CONTROL VALVE FOR A PROCESS PLANT

This application claims the benefit and priority of and to German patent application No. 20 2019 104 694.5, filed Aug. 27, 2019. German patent application No. 20 2019 104 694.5, filed Aug. 27, 2019 is incorporated herein by reference hereto in its entirety.

FIELD OF THE INVENTION

The invention relates to a control valve of a process plant.

BACKGROUND OF THE INVENTION

A generic control valve is used for adjusting the flow of a process fluid in a process plant. The control valve comprises an actuator and a valve unit having a valve body with an inlet, an outlet and a passage which extends therebetween along a longitudinal axis and which is adapted to allow the flow of the process fluid therethrough. An actuating member is movably mounted within the valve body and used to make the passage wider, or narrower, or close it altogether, as a function of the setting of a positioner. The actuator is used to convert a signal from the positioner into a movement that will cause the actuating member to assume the respective position. Via a frame, also referred to as a yoke, the actuator can be connected to the valve body of the valve unit with as little offset and as accurate an alignment as possible.

Control valves may include sensors that measure process variables such as pressure, temperature, flow rate, etc. A measuring transducer is used to convert the physical quantity measured into an electrical signal that can be transmitted to an indicator, a recording device and/or a controller and used for control tasks. Connecting cables are used for connecting the sensors to the measuring device, which is located e.g. in the region of the yoke and/or the actuator, for both signal transmission and power supply.

US 2002/0104568 A1 discloses a closing device for a process plant that especially includes a drainage valve. The closing device comprises an actuating member that moves between a first position in which the valve is open, and a second position in which the valve is closed. The actuating member comprises a valve stem and a valve disk which latter has a measurement or detection probe mounted on it for determining process variables of a process fluid. The probe is especially designed to measure the temperature of the process fluid and is connected to a measuring device via lines that extend within the valve stem.

US 2017/0016749 A1 discloses mounting means for arranging a controller on a control valve. The mounting means has a first side and a second side opposite the first side, the first side being connected by connecting means to a yoke that connects the actuator and the valve unit. The control unit is located on the second side of the mounting means. At least one sensor, connected to the control unit by a communicating cable, monitors the properties of the detachable connection of the mounting means. The first side of the mounting means has ribs that intersect to form a net-like profile on the surface. The ribs are adapted to accommodate the cable in a groove, recess or opening, for example. This prevents the cable from being pinched, cut and/or otherwise damaged.

SUMMARY OF THE INVENTION

It is the object of the invention to further develop a control valve whereby increased protection is achieved for a line connecting a sensor arranged on the valve body to a measuring device spaced therefrom by the yoke.

In a manner known per se, a control valve of a process plant comprises an actuator which is connected to a valve body of a valve unit via a yoke. The valve body has a connection region including a housing flange for connection to the yoke. Between an inlet and an outlet of the valve body, there is a passage adapted for the flow of a process fluid therethrough. The inlet and the outlet are each located in a fluid connection region of the valve body which may have a flange for connection to a counter piece of the process plant. In the passage from the inlet to the outlet there is an actuating member that is adapted to be moved in particular axially by the actuator and is used for adjusting the process fluid flow. In order to interrupt the flow, the closure portion of the actuating member, e.g. a valve plate or a valve cone, is pressed sealingly against the surface of a suitably shaped opening of the valve body, also referred to as the valve seat.

According to the invention, the housing flange of the valve body has a recess and a yoke mounting portion that is designed as a bolt hole circle with radially arranged connecting holes. The connecting holes of the bolt hole circle can be arranged symmetrically, for example. They serve to receive fasteners, for example screws, that are used to apply a contact pressure for connecting the housing flange to the yoke in a sealing and detachable manner, with the contact pressure being distributed as evenly as possible.

The recess in the housing flange is formed in the base material of the housing flange. In an advantageous way, the recess allows a line, in particular a cable, to be passed through the housing flange. The recess may be formed in the axial longitudinal direction of the housing flange, for example. The diameter of the recess may correspond to the diameter of the connecting holes, or it can be different therefrom.

Furthermore, the invention relates to a conventional control valve for a process plant as described above, comprising an actuator which is connected to a valve body of a valve unit via a yoke. In the direction of the actuator, the valve body has a housing flange which may have a mounting region, for example, provided with a bolt hole circle which latter has connecting holes for receiving connecting means therein that are used to connect the housing flange to the yoke. At least one sensor is arranged on the valve body. The sensor may, for example, protrude through a hole in the valve body into the passage between the inlet and the outlet of the valve body. The sensor may be adapted to measure a process variable of the process fluid. Via at least one line, which in particular takes the form of electrical cabling, the sensor is connected to and communicates with a measuring device that is provided on the yoke and/or the actuator. The measuring device may comprise a measuring transducer and/or a positioner and/or other peripheral devices, for example.

According to the invention, the cable connecting the sensor to the measuring device is accommodated in a recess in the housing flange. In an advantageous way, the recess makes it easier to guide the cable along the housing flange, thus avoiding the need to additionally fix or attach the cable on the housing flange. The cable is guided in the recess in the housing flange, which protects the cable in particular from damage close to the housing, for example during transport or any other handling.

Preferably, the yoke comprises at least two support columns and a sealing flange, with the sealing flange being connected to the housing flange to seal the valve body, and the support columns connecting the sealing flange to a connection of the actuator so that the sealing flange and the actuator are spaced apart from each other in the longitudinal direction of the support columns. The use of a yoke with support columns between the actuator and the valve unit allows easy access to the drive rod for the installation and/or maintenance of a field device. The length of the support columns can be adapted to the ambient temperature they are exposed to on the outside, and to the process temperature prevailing within the valve unit.

The sealing flange of the yoke is used for mounting the yoke with the housing flange of the valve body. The sealing flange is designed as an end portion or cover of the valve body so as to seal the valve unit towards the actuator. The sealing flange of the yoke may have connecting holes that will align with the connecting holes of the housing flange. The sealing flange and the housing flange are detachably connected to each other by connecting means, for example screws, which pass through the aligned connecting holes.

According to a preferred embodiment, the sealing flange has a recess that is integrally formed with the yoke, with the recess in the sealing flange being aligned with the recess in the housing flange. The recess in the sealing flange transitions into the recess in the housing flange. The sensor cable accommodated in the recess in the housing flange is thus guided directly from the recess in the housing flange into the recess in the sealing flange. As the line transitions from the valve body to the yoke, it runs inside the radially outer circumference of the housing flange and the sealing flange, resp., which provides increased protection of the line against damage, e.g. pinching and/or severing the line.

Preferably, at least one support column has a recess, with the support column recess being formed integrally with the yoke. The support columns of the yoke are of a robust design in order to withstand the forces, moments and torques exerted by the actuator. The support column recess is located in the base material of the support column which is in particular made of metal. The sensor cable is advantageously guided in the recess in the support column. The robust design of the support column protects the cable from damage and radiations. The support column can also be used for shielding against any radiation as may either be emitted by the cable itself or may act on the cable from outside.

According to a preferred embodiment, the recess in the sealing flange and the recess in the support column are aligned with each other. The sealing flange recess transitions seamlessly into the support column recess, so that the line is protected within the base material of the yoke at the transition from the sealing flange to the support column. This advantageously prevents the cable from being pinched, cut and/or otherwise mechanically damaged in the transition from the sealing flange to the support column.

Preferably, the support column recess is formed over the entire length of the support column. The length of the yoke and in particular the length of the support columns which extend between the sealing flange and a connection to the actuator, are, among other things, adapted to the ambient temperature acting on them from the outside, and to the process temperature prevailing within the valve unit. The sensor cable is guided in the recess extending over the entire length of the support column. This affords increased protection of the cable, especially against mechanical damage such as pinching and/or cutting. The support columns are preferably made of metal and may also protect against radiation, for example radiation emitted by the line itself or radiation acting on the line from outside.

Preferably, the support columns are each located behind the fluid connection regions, which each have the inlet and outlet of the valve body, with the support columns being arranged between the inlet and the outlet at an angle of between 0° and 15° with respect to the main axis. The fluid connection portions of the valve body, for example, each have a flange as a connecting element to a counter piece of the process plant. The flange extends in a projection that partially protrudes beyond the valve body, thus providing increased protection against mechanical damage behind the fluid connection regions. This affords good protection in particular of the sensor line because the latter is guided behind the fluid connection region of the measuring device through the support column recess and through the sealing flange recess into the recess in the housing flange and, after emerging from the recess in the housing flange, along the outside of the valve body to the sensor which latter is preferably also arranged on the valve body behind the fluid connection region. In an advantageous way, the line is largely protected as it is guided behind the respective fluid connection region.

According to one embodiment, the recess in the housing flange is designed as a portion that is recessed outwards in the radial direction. The recess is designed as a groove or an open slot/channel within the maximum circumference of the housing flange, so that the cable guided in the recess is better protected against damage such as pinching, cutting, etc.

Similarly, the recess in the sealing flange and/or the recess in the support column can be designed as a portion that is recessed outwards in the radial direction.

According to an alternative embodiment, the recess in the housing flange has a closed cross-sectional contour. In particular, the entire recess in the housing flange may be radially encased by the base material of the housing flange, resulting in better protection of the cable in the recess from damage and radiation, especially by the metallic shield of the housing flange. It is also possible for the recess to be radially encased in part, so that it has a closed cross-sectional contour in some parts and an open cross-sectional contour in other parts.

The recess in the sealing flange and/or the recess in the support column can also have a closed cross-sectional contour, as described above, in order to provide increased protection for the guided line.

Additional advantages, features and possible applications of the present invention may be gathered from the description which follows in which reference is made to the embodiments illustrated in the drawings.

Throughout the description, claims and drawings, those terms and associated reference signs are used as are listed in the list of reference signs below.

DESCRIPTION OF THE INVENTION

Figure 1:
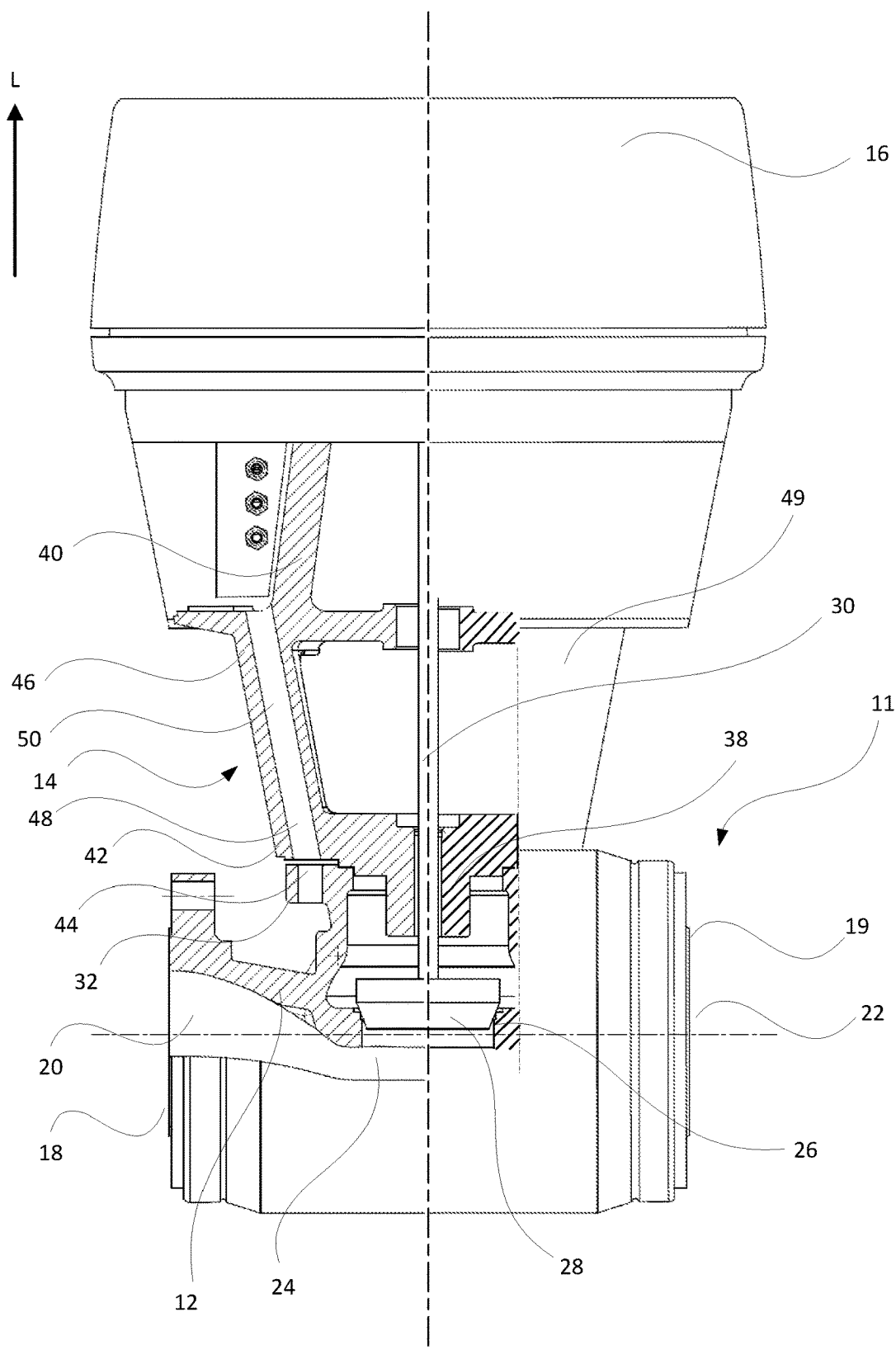
FIG. 1 is a sectional view of a control valve according to the invention.

FIG. 1 is a partial sectional view of a control valve 10 according to the invention. The control valve 10 comprises a valve unit 11 whose valve body 12 is connected to an actuator 16 via a yoke 14. In this view, the valve body 12 has an inlet 20 and an outlet 22 which are each located in a fluid connection region 18, 19. The fluid connection regions 18, 19 each serve for connection to a counter piece of the process plant. A passage 24 extends along a longitudinal axis between the inlet 20 and the outlet 22, which passage is adapted for the flow of a process fluid therethrough. A valve seat 26 is provided in the passage 24 from the inlet 20 to the outlet 22. The aperture of the valve seat 26 is opened and/or closed by a valve cone 28 of the control valve so as to allow or obstruct the flow of process fluid from the inlet 20 to the outlet 22. The valve cone 28 is located on a valve stem 30 connected to the actuator 16.

The valve body 12 is detachably connected to the yoke 14 via a housing flange 32. For connection to the yoke 14, the housing flange 32 has a yoke fastening region 33 with a bolt hole circle 34, which region 33 is not shown here. This bolt hole circle 34 has connecting holes 36 for the insertion of connecting means, for example screws, via which a contact pressure can be applied for connecting the housing flange 32 to the yoke 14 in a sealing and detachable manner.

As shown here, the yoke 14 is designed to have a sealing flange 38 and two support columns 46 extending in an axial longitudinal direction L. The support columns 46 connect the sealing flange 38 to a connection 40 that connects the actuator 16 to the yoke 14. The sealing flange 38 is detachably connected to the housing flange 32 of the valve unit 11 and is designed with a cover 42 that seals the valve unit 11 towards the yoke 14.

According to the invention, the housing flange 32 connected to the yoke 14 has at least one recess 44 in addition to the connecting holes 36 of the bolt hole circle 34. As shown here, the recess 44 is completely encased radially by the structure of the housing flange 32. It is also conceivable for the recess 44 to form a portion that is recessed in the radial direction R of the housing flange 32, for example a groove or a channel. The recess 44 can be advantageously used to guide a cable, such as electrical wiring. The housing flange is connected to the sealing flange 38 of the yoke 14 via a yoke fastening region 33 not shown here. The sealing flange 38 has a cover 42 for sealing the valve body 12.

The recess 44 of the housing flange 32 merges into the recess 48 of the sealing flange 38, which recess 48 in turn merges directly and seamlessly into the support column recess 50, which in this case extends over the entire length of the support column 46. In the present case, the recess 44 is radially encased over its entire length by the base material of the housing flange 32. The sealing flange recess 48 and the support column recess 50 are completely encased by the base material of the yoke 14. This provides increased protection, in particular against mechanical damage such as pinching and/or cutting, for a cable guided through the housing flange 32 and the yoke 14. The support column 44 is preferably made of metal and adapted to protect against radiation, for example radiation emitted by the cable itself or radiation acting on the cable from outside.

Figure 2:
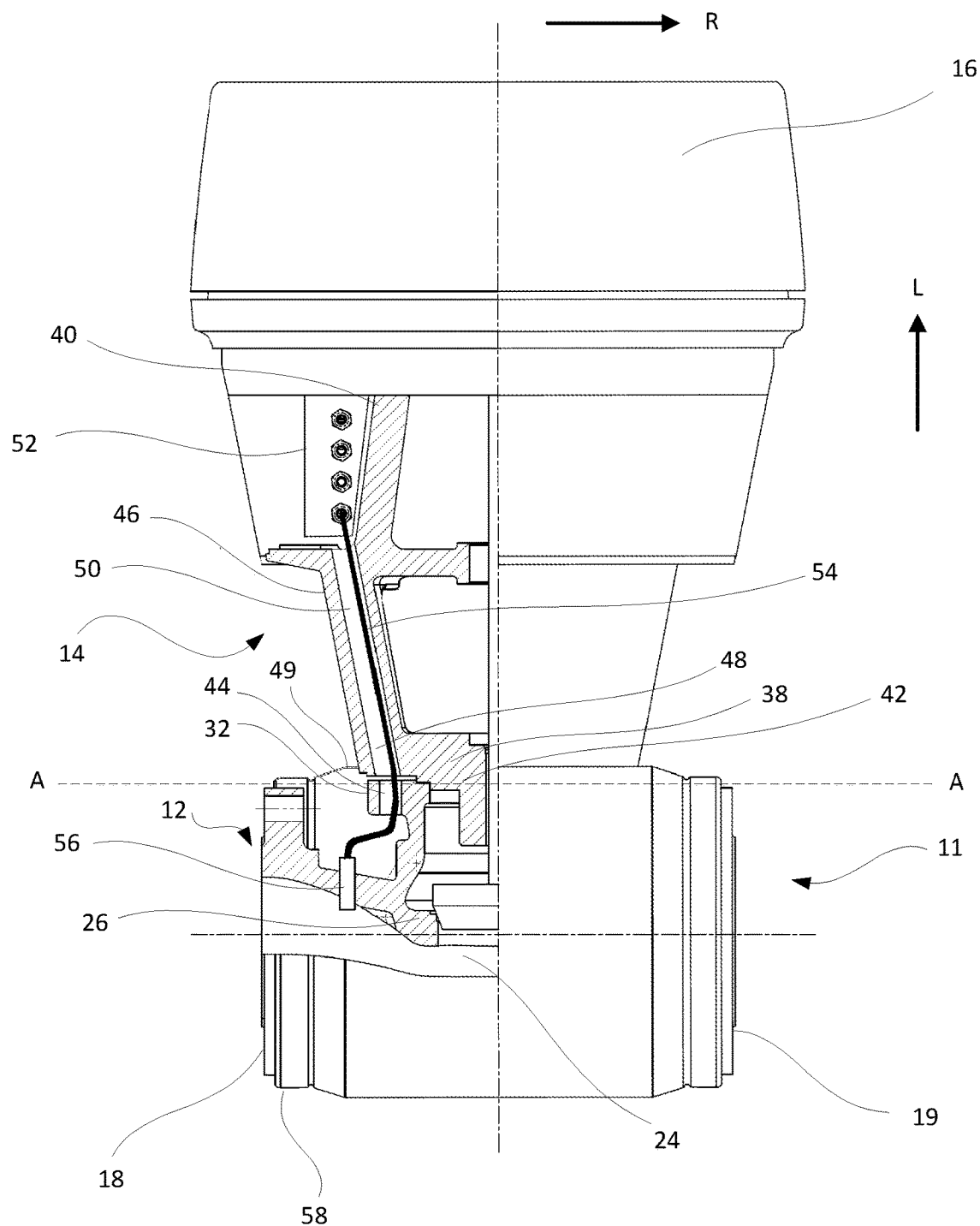
FIG. 2 is a sectional view of a valve body of a control valve according to the invention connected to a yoke.

FIG. 2 is a partially sectional view of a control valve 10 according to the invention.

The actuator 16 of the control valve 10 is connected to the valve body 12 of the valve unit 11 via the yoke 14. The control valve is of a modular design. In particular, the yoke 14 connected to the actuator and the valve body 12 can be combined in order to provide a high degree of flexibility for the configuration of the control valve 10.

As seen here, a measuring device 52 is located at an end of yoke 14 opposite the valve body 12. It is also conceivable for a positioner or any other peripheral device to be arranged on the yoke 14 and/or on the actuator 12. The measuring device 52 is connected to a sensor 56 located on the valve body 12 via a line 54 which in particular takes the form of electrical cabling. In the present case, the sensor 56 is arranged in a through-hole in the valve body 12 so that it protrudes into the passage 24 between the inlet 20 and the outlet 22, for example for measuring a process variable of the process fluid.

In this case, the sensor 56 is located behind the fluid connection region 18 which is provided with a flange 58 for connection to a counter piece of the process plant. The flange 58 thus extends in a projection that partially protrudes beyond the valve body 12. The line 54 of the sensor 56 is arranged behind the fluid connection region 18, i.e. behind the projection of the flange 58, on the outside of the valve body 12 and extends uncovered up to the recess 44 of the housing flange 32. The uncovered line 54 which extends on the outside of the valve body 12, is advantageously protected by the radially projecting flange 58, in particular against mechanical damage. Furthermore, as seen here, a jacket 49 may be arranged behind the fluid connection region 18 between the projecting flange 58 and the yoke 14, for example a screwed-on sheet metal jacket which encases the region in which the exposed line 54 is arranged, thus increasing the protection of the line 54.

As shown in FIG. 2, the line 54 is guided in the recess 44 of the housing flange 32. As seen here, the recess 44 is radially encased over its entire length by the base material of the housing flange 32. The recess 44 of the housing flange 32 is aligned with the sealing flange recess 48, which merges seamlessly into the support column recess 50. As seen here, the support column recess 50 extends over the entire length of the support column 46. The sealing flange recess 48 and the support column recess 50, in which the line 54 is guided, have a closed cross-sectional contour over their entire length, as shown here. The line 54 is guided within the respective structure of the housing flange 32 and the yoke 14, which affords increased protection for the line 54, both against mechanical damage and radiation.

Figure 3:
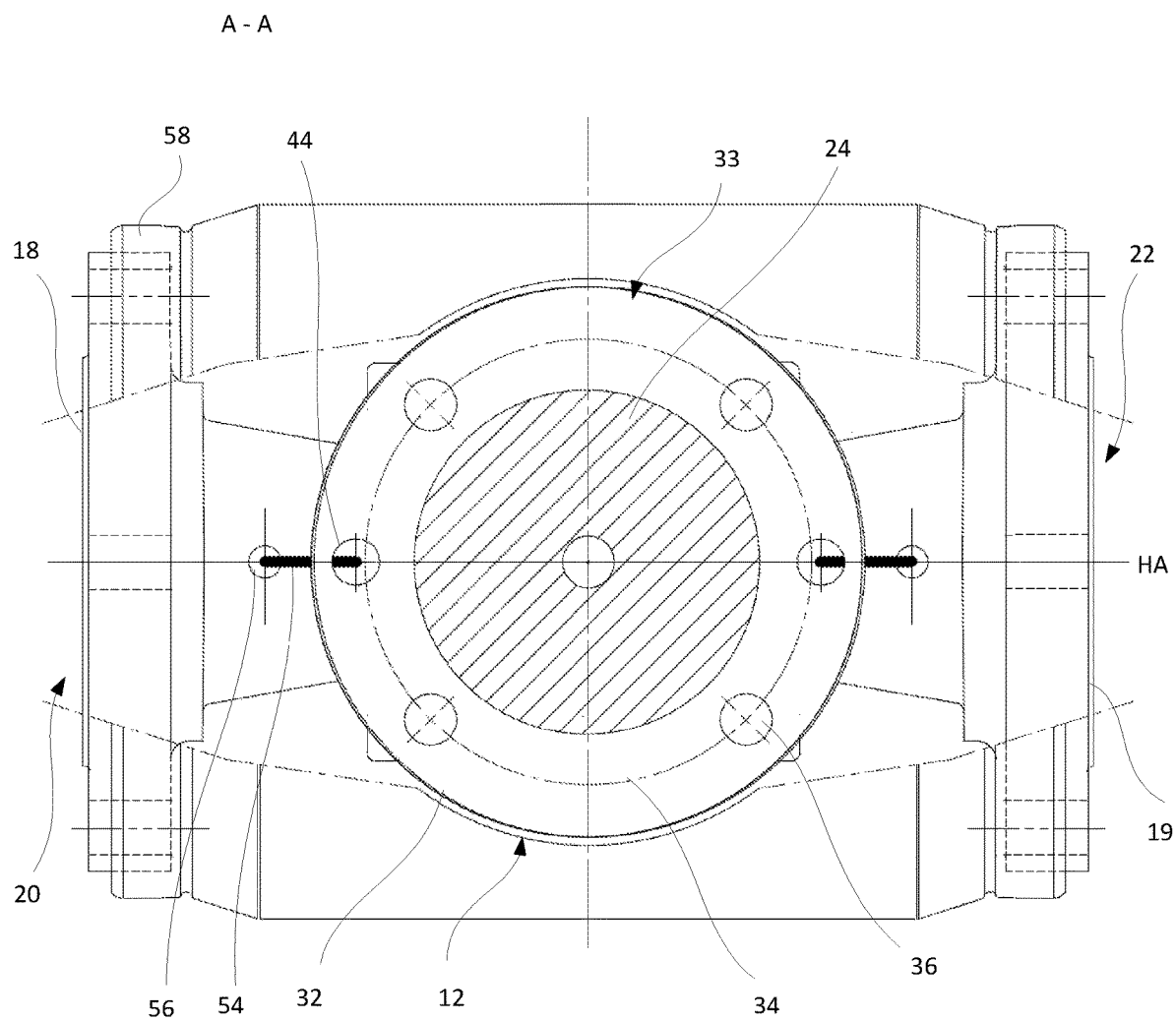
FIG. 3 is a cross-sectional view of a valve unit, taken through a housing flange, as viewed from above.

FIG. 3 is a cross-sectional view taken along lines A-A of the housing flange 32 of the control valve 10 of FIG. 2. The valve body 12 has a housing flange 32 which can be connected to a sealing flange 38 (not shown here) of the yoke 14. According to the invention, the housing flange 32 has a recess 44 and a yoke fastening region 33 which is designed as a bolt hole circle 34 with radially arranged connecting holes 36. As seen here, the recess 44 is radially encased by the housing flange 32. The connecting holes 36 of the housing flange are arranged symmetrically in this view. They serve to accommodate connection means, for example screws, used for applying a contact pressure for connecting the housing flange 32 to the sealing flange 38 of the yoke 14 in a sealing and detachable manner.

The valve body 12 has a passage 24 between the inlet 20 and the outlet 22 adapted to allow process fluid to flow therethrough. The inlet 20 and the outlet 22 are each formed in a fluid connection region 18, 19 which has a projecting flange 58. In this view, a sensor 56 is located on the valve body 12 behind the fluid connection region 18. Line 54 connects the sensor 56 to a measuring device 52 (not shown here) in a communicating manner, which line 54 runs on the outside of the valve body 12 where it extends from the sensor 56 to the recess 44 of the housing flange 32, from where the line 54 is then guided in the recess 44 of the housing flange 32, then in the sealing flange recess 48 (not shown here) and finally in the support column recess 50. The support columns 46 (not shown here) are each arranged between the inlet 20 and the outlet 22 behind the two fluid connection regions 18, 19 at an angle of between 0° and 15° relative to the main axis HA. As seen here, the entire routing of the line 54 is arranged behind the projecting flange 58 of the fluid connection region 18 and is thus advantageously protected from being gripped from behind and from mechanical damage.

LIST OF REFERENCE SIGNS

- 10 control valve
- 11 valve unit
- 12 valve body
- 14 yoke
- 16 actuator
- 18 fluid connection region
- 19 fluid connection region
- 20 inlet
- 22 outlet
- 24 passage
- 26 valve seat
- 28 valve cone
- 30 valve stem
- 32 housing flange
- 33 yoke fastening region
- 34 bolt hole circle
- 36 connecting hole
- 38 sealing flange
- 40 connection
- 42 cover
- 44 recess in the housing flange
- 46 support column
- 48 recess in the sealing flange
- 49 jacket
- 50 support column recess
- 52 measuring device
- 54 line
- 56 sensor
- 58 flange
- L longitudinal direction
- R radial direction
- HA main axis

The invention claimed is:

1. Control valve (10) for a process plant, comprising:
an actuator (16) connected to, and spaced from, a valve body (12) of a valve unit (11) via a yoke (14);
said valve body (12) of said valve unit (11) includes a housing flange (32) that is detachably connected to said yoke (14);
said housing flange (32) includes a recess therethrough;
said valve body (12) having an inlet (20) and an outlet (22) for the flow of a process fluid therethrough;
said inlet (20) and said outlet (22) each being located in a fluid connection region (18, 19);
said inlet (20) and said outlet (22) interconnected by a passageway 24 therebetween;
an actuating member (28) resides in said passageway (24) is adapted to be displaced by said actuator for controlling the flow rate of said process fluid within and through said valve body (12);
a sensor (56) is mounted in said valve body (12);
said sensor (56) is connected via an electrical cable (54) for communication with a measuring device (52) arranged on said yoke (14) and/or on said actuator (16);
said electrical cable (54) resides partially in said recess (44) of said housing flange (32) of said valve body (12) connected to said yoke (14).

2. Control valve according to claim 1, further comprising:
said actuator (16) includes a connection (40);
said yoke (14) includes a sealing flange (38);
said sealing flange (38) includes at least two support columns (46);
said at least two support columns (46) of said sealing flange (38) of said yoke (14) extend in an axial longitudinal direction (L);
said sealing flange (38) connected to said housing flange (32) for sealing said valve body (12);
said support columns (46) of said sealing flange (38) of said yoke connecting said sealing flange (38) of said yoke to said connection (40) of said actuator (16);
said housing flange (32) of said valve body and said actuator (16) are arranged spaced apart from one another in said axial longitudinal direction (L) of said support columns (46).

3. Control valve according to claim 2, further comprising:
said support columns (46) of said sealing flange (38) are arranged between the inlet (20) and the outlet (22) of said valve body.

4. Control valve according to claim 1, further comprising:
said sealing flange (38) has a recess (48) formed integrally therewith; and,
said sealing flange recess (48) being aligned with said recess (44) of said housing flange (32) of said valve body (12).

5. Control valve according to claim 4, further comprising:
said support columns (46) of said sealing flange (38) of said yoke have recesses (50) formed integrally with said sealing flange (38) of said yoke (14).

6. Control valve according to claim 5, further comprising:
said sealing flange recess (48) and said support column recess (50) are aligned with one another;
said electrical cable (54) communicates between said sensor (56) and said measuring device 52, and said electrical cable (54) resides within said valve body (12), said recess (44), said sealing flange recess (48) and said support column recess (50).

7. Control valve according to claim 6, further comprising:
said support columns (46) have lengths;
said support column recesses (50) are provided over the entire lengths of said support columns (46).

8. Control valve according to claim 5, further comprising:
said sealing flange recess (48) and/or said support column recess (50) has a closed cross-sectional contour.

9. Control valve according to claim 1, further comprising:
said recess (44) of said housing flange (32) has a closed cross-sectional contour.

* * * * *